United States Patent [19]

Eraud

[11] Patent Number: 4,470,443

[45] Date of Patent: Sep. 11, 1984

[54] TREAD FOR OFF-THE-ROAD TIRES

[75] Inventor: Roger Eraud, Clermont-Ferrand, France

[73] Assignee: Compagnie Generale des Etablissements Michelin, Clermont-Ferrand, France

[21] Appl. No.: 474,123

[22] Filed: Mar. 10, 1983

[30] Foreign Application Priority Data

Mar. 22, 1982 [FR] France .............................. 82 04956

[51] Int. Cl.$^3$ .............................................. B60C 11/06
[52] U.S. Cl. ................................ 152/209 R; D12/140
[58] Field of Search ........... 152/209 R, 209 A, 209 B, 152/209 D, 209 NT; D12/138, 139, 140

[56] References Cited

U.S. PATENT DOCUMENTS

| 3,875,986 | 4/1975 | Boileau ........................ | 152/209 R |
| 4,055,209 | 10/1977 | Senger ........................ | 152/209 R |
| 4,222,423 | 9/1980 | Jamain ......................... | 152/209 R |
| 4,223,712 | 9/1980 | Iwata et al. .................... | 152/209 R |
| 4,383,568 | 5/1983 | Pieper ........................... | 152/209 R |

FOREIGN PATENT DOCUMENTS

| 879494 | 8/1971 | Canada ........................ 152/209 R |
| 2021494 | 12/1979 | United Kingdom . |
| 1588290 | 4/1981 | United Kingdom . |

Primary Examiner—Lois E. Boland
Attorney, Agent, or Firm—Brumbaugh, Graves, Donohue & Raymond

[57] ABSTRACT

A tire whose crown is extended on both sides by a sidewall terminating in a bead and is provided with a tread formed in the major part of adjacent blocks separated from each other in the axial direction of the tire by circumferential or oblique grooves is characterized by the fact that at least some of the circumferential or oblique grooves separating the adjacent blocks in the axial direction have a cross section which decreases substantially from the leading edge to the trailing edge of the blocks.

7 Claims, 4 Drawing Figures

TREAD FOR OFF-THE-ROAD TIRES

The present invention relates to improvements in treads of so-called "all terrain" tires capable of traveling on ground of poor consistency at the surface (mud, melting snow, etc.). It therefore concerns more particularly treads which are formed in the major part of adjacent blocks which are separated from each other in the axial direction of the tire by circumferential or oblique grooves.

When a tire provided with such a tread advances over the ground, it slides due to the lack of consistency of the surface of the ground. This sliding is a function of the relatively poor resistance to shear of the ground opposed to the traction force developed by the tire.

The object of the invention is to improve the adherence of tires having treads of the type considered above to ground of poor surface consistency.

Accordingly, the invention relates to a tire whose crown is extended on both sides by a sidewall terminating in a bead and is provided with a tread formed in the major part of adjacent blocks separated from each other in the axial direction of the tire by circumferential or oblique grooves, characterized by the fact that at least some of the circumferential or oblique grooves separating the adjacent blocks in axial direction of the tire have a cross section area which decreases substantially from the leading edge to the trailing edge of the blocks.

The leading edge of a block is the edge which first touches the ground when the tire advances over the ground, while the trailing edge is the one which leaves the ground last.

Since a groove is defined by the walls of two adjacent blocks and the extension from block to block of the surface intended to come into contact with the ground as well as the bottom of the tread, the cross section area of a groove is the intersection of a plane perpendicular to the median plane of the walls of the groove with said walls, the bottom and the contact surface of the tread.

In the ordinary case known per se in which the walls of the circumferential or oblique grooves in accordance with the invention are of constant inclination, at least equal to 90°, with respect to the surface of contact with the ground, these walls may have spacings, measured at the level of the surface of contact with the ground, which decreases from the leading edge in the direction towards the trailing edge of adjacent blocks. If furthermore the walls defining the grooves in question are flat, these walls can form with each other angles of between 12° and 30° which are open in the direction towards the leading edges of the blocks. These angles are measured, for example, at the level of the surface of contact of the blocks with the ground. It goes without saying that the above definitions do not take into account the small roundings which customarily replace the corners of the blocks present between the surface of contact of the blocks with the ground and the bottom of the grooves or of the tread and intended to avoid the tearing off of these corners in contact with the ground.

In accordance with another advantageous embodiment, the circumferential or oblique grooves of the invention are connected by other grooves, known per se, which are inclined slightly to the axial direction of the tire or are parallel to it and are of identical depth and define the blocks in the circumferential direction. Furthermore, the circumferential or oblique grooves in accordance with the invention have bottoms which form angles of between 5° and 20° with the surface of contact of the blocks with the ground and are open in the direction towards the leading edges of the blocks. In this variant, it is also advantageous for the bottoms of the circumferential or oblique grooves of the invention to be arranged at the same depth as the bottoms of the grooves defining the blocks in the circumferential direction at the level of the leading edges of the blocks and to be connected to these bottoms by roundings (of S shape as seen in section) at the level of the trailing edges of the blocks.

In a third preferred variant, at least some of the circumferential or oblique grooves in accordance with the invention are arranged axially so as to debouch into the leading edge of the block following them in the circumferential direction of the tire. As a matter of fact, the basic concept of the invention resides in the convergence, between the leading edge and the trailing edge of the blocks, of the walls and/or the bottoms of the oblique or circumferential grooves separating these blocks in axial direction with respect to the flow, for example, of the ground of poor consistency in these grooves. The cross section offered by the circumferential or oblique grooves to this flow therefore decreases from the leading edges to the trailing edges of the adjacent blocks in axial direction. When these circumferential grooves or oblique grooves, that is to say grooves forming, on the average, an angle less than or preferably far less than 45° with the circumferential direction, open up at the level of the trailing edges of the blocks in accordance with the above variant into a quasi-transverse groove opposite another block, the compacting of the flow of mud is further improved since the flow is divided and the direction of the partial flows varies suddenly by 90° or more.

In order to take into account the possible differences in the nature and properties of inconsistent soils on the surface of contact of the blocks with the ground, the decrease in the cross section area offered by the circumferential or oblique grooves to the flow of these different inconsistent soils in these grooves is such that the cross section area of the groove corresponding to the trailing edge of the blocks is between 0.35 and 0.60 times the cross section area of the same groove corresponding to the leading edge of the blocks.

One embodiment of the invention is shown in the drawing and described below with reference to said drawing, in which.

Figure 1:
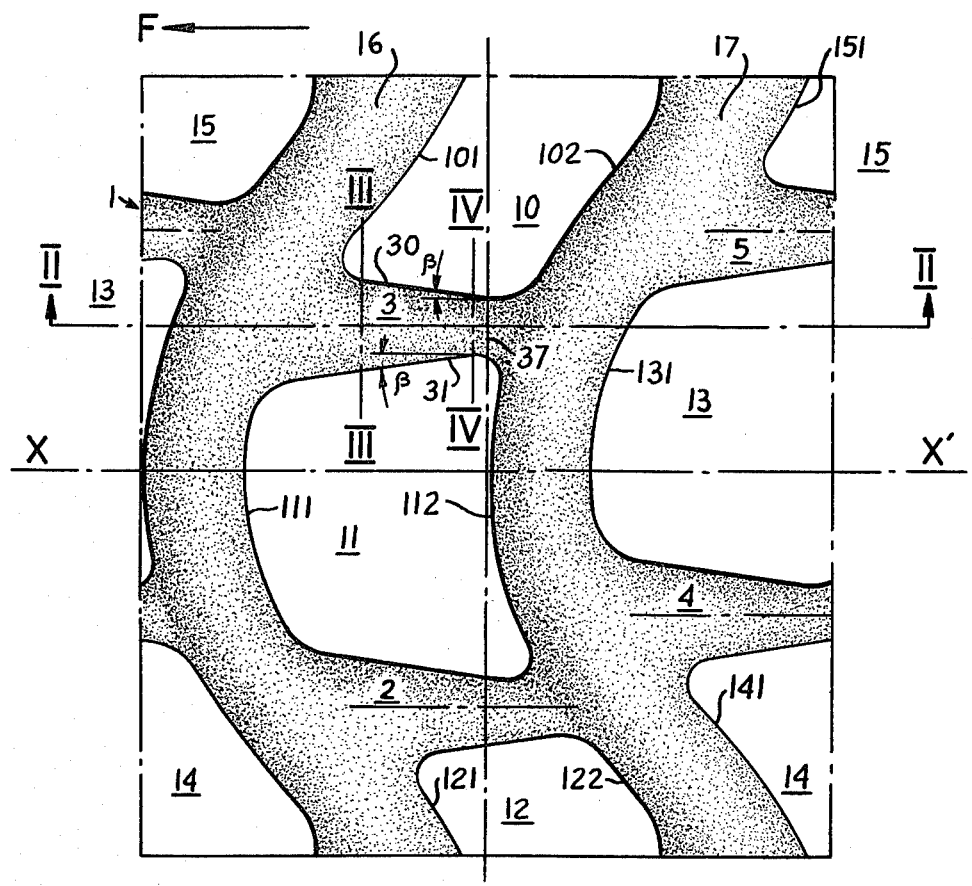
FIG. 1 is a partial plan view of a tread in accordance with the invention.

The tread 1 of FIG. 1 is formed of blocks 10 to 15. Three blocks 10 to 12, adjacent in axial direction, form a first row of blocks 10 to 12 separated from the preceding and following rows of blocks 13 to 15 in the circumferential direction by grooves 16 and 17 of transverse orientation on the average. In the first row the adjacent blocks 10 to 12 each has a leading (front) edge 101, 111, 121 which touches the ground first with due consideration of the arrow F indicating the direction of rotation of the tire. Each of these blocks 10 to 12 leaves the ground by its trailing (rear) edge 102, 112, 122. In the second row of blocks 13 to 15 (shown in part), which are separated in the circumferential direction from the blocks 10 to 12 of the first row by the quasi-transverse groove 17, the blocks 13 to 15 act on the ground by their leading (front) edges 131, 141, 151 which are contiguous to the quasi-transverse groove 17.

In each row of axially adjacent blocks 10 to 12 and 13 to 15, circumferential or oblique grooves 2, 3, 4, 5 in accordance with the invention separate the central blocks 11; 13 from the side blocks 10, 12; 14,15. In accordance with a preferred variant, the circumferential or oblique grooves 2, 3 of the invention of a row of blocks 10 to 12 are staggered axially with respect to the circumferential or oblique grooves 4, 5 of the invention of the following row of blocks 13, 14, 15. Thus the circumferential or oblique grooves 2, 3 of a row of blocks 10 to 12 debouch into the quasi-transverse groove 17 downstream of the trailing edges 102, 112, 122 of the blocks 10, 11, 12 but opposite the leading edges 131, 141, 151 of the blocks 13, 14, 15 of the following row.

Figure 2:
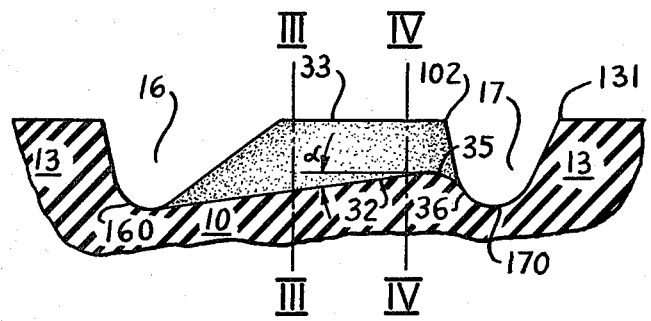
FIGS. 2 to 4 are sectional views taken along planes II—II, III—III and IV—IV, respectively, of FIG. 1 through a circumferential or oblique groove in accordance with the invention forming part of the tread shown in FIG. 1.
Figure 3:
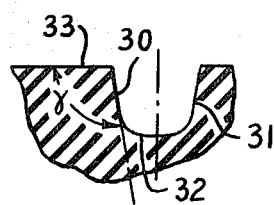
Figure 4:
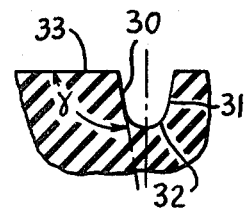

FIGS. 3 and 4 show cross sections taken along planes III—III and IV—IV of FIG. 1 through the circumferential or oblique groove 3 of the invention, located between a central block 11 and an adjacent side block 10. In this example, the median plane of this circumferential or oblique groove 3 is the plane II—II of FIG. 1 parallel to the equatorial plane of trace XX' of the tire. The longitudinal section through circumferential or oblique groove 3 along the median plane II—II is shown in FIG. 2. The walls 30, 31 of this circumferential or oblique groove 3 are flat and form angles $\beta$ of 8° with the circumferential direction and angles $\gamma$ of 100° with the surface of contact 33 with the ground.

The cross section of FIG. 3 is taken closer to the leading edges 101, 111 of the blocks 10, 11 than is the cross section of FIG. 4. In accordance with the invention, the surface or area of the cross section of FIG. 3 is larger than the surface or area of the cross section of FIG. 4 which is taken at a greater distance from the leading edges 101, 111 of the blocks 10, 11.

FIG. 2 is a longitudinal sectional view through circumferential or oblique groove 3 according to the invention taken along the median plane II—II in FIG. 1 of this groove 3. This longitudinal section of FIG. 2 is seen upwards with respect to FIG. 1, that is to say from the equatorial plane of trace XX' in the direction towards the side block 10 and the edge of the tread 1. According to the invention, the surface or area of the cross sections III—III and IV—IV decreases from section III—III to section IV—IV, that is to say in the direction towards the trailing edges 102, 112. This decrease results both from the convergence of the sidewalls 30, 31 of the circumferential or oblique groove 3 and from the fact that the bottom 32 of the groove 3 forms an angle $\alpha$ of an inclination of 7° with a line parallel to the travel surface 33 of the block 10, that is to say of the treat 1. This angle $\alpha$ opens up in the direction towards the leading edges 101, 111 of the blocks 10, 11.

The point 35 of the inclined bottom 32 which is closest to the surface of contact 33 of the tread 1 with the ground is located approximately directly below the trailing edges 102, 112 of the adjacent blocks 10, 11. This point 35 of maximum radial narrowing of the cross section of the circumferential or oblique groove 3 coincides approximately with the maximum axial narrowing 37 of the cross section of the groove 3. A very short S-shaped rounding 36 connects the point 35 of maximum radial narrowing to the bottom 170 of the downstream quasi-transverse groove 17 contiguous to the trailing edges 102, 112 of the adjacent blocks 10, 11.

I claim:

1. A tire, intended to travel on ground of poor surface consistency, with a crown extended on both sides by a sidewall terminating in a bead and provided with a tread formed in the major part of adjacent blocks separated from each other in the axial direction of the tire by circumferential grooves or oblique grooves forming with the circumferential direction of the tire an angle less than 45°, characterized by the fact that at least some of the circumferential or oblique grooves have a cross section area which decreases substantially from the leading edge to the trailing edge of the blocks and have walls which converge in the direction from the leading edge to the trailing edge of the blocks.

2. A tire according to claim 1, characterized by the fact that the circumferential or oblique grooves have walls which, on the one hand, are of constant inclination, at least equal to 90° with respect to the surface of contact with the ground, and, on the other hand, are separated by distances which decrease substantially from the leading edge to the trailing edge of the adjacent blocks.

3. A tire according to claim 2, characterized by the fact that the circumferential or oblique grooves have walls which, on the one hand, are flat, and, on the other hand, form with each other angles of between 12° and 30° and are open in the direction towards the leading edges of the blocks.

4. A tire according to claim 1, 2, or 3, characterized by the fact that the circumferential or oblique grooves are connected by other grooves which are inclined slightly to the axial direction of the tires or are parallel to it and are of identical depth and define the blocks in the circumferential direction.

5. A tire according to claim 4, characterized by the fact that the circumferential or oblique grooves have bottoms which form angles of between 5° and 20° with the surface of contact of the blocks with the ground and are open in the direction towards the leading edges of the blocks, the bottoms of the circumferential or oblique grooves being, on the one hand, arranged at the same depth as the bottoms of the grooves defining the blocks in the circumferential direction at the level of the leading edges of the blocks and, on the other hand, connected to said bottoms by roundings at the level of the trailing edges of the blocks.

6. A tire according to claim 1, characterized by the fact that at least some of the circumferential or oblique grooves are arranged axially so as to debouch onto the leading edge of the block following them in the circumferential direction of the tire.

7. A tire according to claim 1, characterized by the fact that the cross section area of the groove corresponding to the trailing edge of the blocks is between 0.35 and 0.60 times the cross section area of the same groove corresponding to the leading edge of the blocks.

* * * * *